(12) United States Patent
Iftime et al.

(10) Patent No.: US 7,238,397 B2
(45) Date of Patent: Jul. 3, 2007

(54) BLACK/WHITE CHOLESTERIC BISTABLE DISPLAY WITH INCREASED WHITE REFLECTIVITY

(75) Inventors: Gabriel Iftime, Mississauga (CA); Peter M. Kazmaier, Mississauga (CA)

(73) Assignee: Xerox Corporation, Stamford, CT (US)

( * ) Notice: Subject to any disclaimer, the term of this patent is extended or adjusted under 35 U.S.C. 154(b) by 250 days.

(21) Appl. No.: 11/004,752

(22) Filed: Dec. 3, 2004

(65) Prior Publication Data
US 2006/0121212 A1 Jun. 8, 2006

(51) Int. Cl.
C09K 19/52 (2006.01)
C09K 19/54 (2006.01)
G02F 1/1333 (2006.01)

(52) U.S. Cl. ............... 428/1.3; 252/299.01; 252/299.5; 349/88; 349/185

(58) Field of Classification Search ............... 428/1.1, 428/1.3; 252/299.7, 299.5, 299.01; 349/175, 349/183, 185, 88
See application file for complete search history.

(56) References Cited

U.S. PATENT DOCUMENTS

| | | | |
|---|---|---|---|
| 5,691,798 A | 11/1997 | Smith | |
| 6,172,720 B1 * | 1/2001 | Khan et al. | 349/35 |
| 6,767,480 B2 | 7/2004 | Iftime et al. | |
| 6,824,708 B2 | 11/2004 | Iftime et al. | |
| 2004/0115366 A1 | 6/2004 | Iftime et al. | |
| 2006/0118762 A1 * | 6/2006 | Iftime et al. | 252/299.7 |
| 2006/0119784 A1 * | 6/2006 | Iftime et al. | 349/176 |

* cited by examiner

*Primary Examiner*—Shean C. Wu
(74) *Attorney, Agent, or Firm*—Eugene O. Palazzo; Fay Sharpe LLP

(57) ABSTRACT

A cholesteric display is provided including a bistable liquid crystalline mixture contained between a first substrate and a second substrate of a liquid crystal cell, and a polymer network orthogonally oriented with respect to the substrates, thereby defining liquid crystal domains, with a dipolar dopant dissolved in the liquid crystalline mixture. A process for producing a cholesteric display is also provided.

16 Claims, 3 Drawing Sheets

SMALL DOMAINS          LARGE DOMAINS

BLACK/WHITE CHOLESTERIC BISTABLE DISPLAY WITH INCREASED WHITE REFLECTIVITY

BACKGROUND

Illustrated herein in embodiments are liquid crystal displays, more specifically, bistable cholesteric liquid crystal displays (LCDs). The displays exhibit enhanced white reflectivity among other characteristics.

The cholesteric liquid crystal display has attracted attention in recent years as an electronic paper (e-paper) type of display device. The cholesteric liquid crystal display is capable of utilizing reflection from surrounding lights as a light source and has a storage property which can hold display contents after the supply voltage is turned off. Further, because an active matrix is not needed for driving the display, cholesteric liquid crystal display devices are capable of providing cost effective large-capacity displays, and may use a flexible substrate which is particularly suitable for e-paper.

A procedure for fabrication of Domain Controlled Liquid Crystal Display providing a bistable display has been described previously by G. Iftime et al., in U.S. Pat. Nos. 6,767,480 B2, 6,824,708 B2 and US Pat. Appl. Publ. (2004) US 2004115366A1, the entire contents of which are incorporated herein by reference. The size of the liquid crystal domains is controlled with an electric field. Consequently, the displays can switch between smaller size domains which strongly scatter the ambient light, i.e. display appears white, and larger sized domains which weakly scatter the ambient light, i.e. display appears transparent. In the transparent state, a viewer sees the color of the background, for example black.

Additionally, a white reflecting cholesteric liquid crystal may be made bistable by the addition of a dipolar dopant into the liquid crystal mixture. However, in order to further increase the reflectivity in the white state, it is necessary to further decrease the size of the smaller size liquid crystal domains. This can be achieved if all the liquid crystal domains are generated of a smaller size, including both of the smaller and larger sized domains in the liquid crystal mixture. This can also be produced by placing the liquid crystal mixture containing a liquid crystal domain stabilizing material into a polymer network, oriented perpendicularly to the substrates. Fixed maximal size of liquid crystal domains can be obtained by phase separation of insoluble polymer network inside the cell.

A procedure for fabricating fixed-size liquid crystal domains has been described previously by J. W. Doane et al. in U.S. Pat. No. 5,691,795, and the procedure was used for fabrication of normal mode, light modulating, polymer stabilized liquid crystal displays (PDLCs). The procedure described involves ultraviolet (UV) initiated polymerization of a monomer dissolved into a cholesteric liquid crystal, which is in a homeotropic state. In the homeotropic state, the molecules of liquid crystal are orthogonally aligned to the cell walls. The homeotropically aligned liquid crystal acts as a template for formation of polymer networks orthogonally aligned to the cell walls.

The monomer contains at least two polymerizable groups capable of producing a wire-like polymer. In previous art, the polymer concentration was tuned to a level suitable for generation of physically separated liquid crystalline domains of about 1 µm to about to 4 µm. At this size, the liquid crystalline domains are strongly scattering, but their size is fixed. This type of device is not bistable, requiring an externally applied electric field to maintain a particular state. Transparent state is achieved by applying an electric field high enough to reach the homeotropic state, but when the electric field is removed, it relaxes back to the strongly scattering state.

Therefore, there is a need for an economical method of making a cholesteric display which is bistable and has improved white reflectivity over previous designs.

BRIEF DESCRIPTION

In accordance with one embodiment of the disclosure, there is provided a bistable cholesteric liquid crystal display including a bistable liquid crystalline mixture contained between a first and a second substrate of a liquid crystal cell or well. A polymer network is orthogonally oriented with respect to the substrates, thereby defining liquid crystal domains, and a dipolar dopant is dissolved in the liquid crystalline mixture.

In a further embodiment, a bistable cholesteric liquid crystal display is provided. The display comprises a liquid crystal cell having a first substrate and a second substrate, a polymer network orthogonally oriented with respect to the substrates thereby defining liquid crystal domains, and a liquid crystalline mixture contained with the cell. The liquid crystal material comprises a dipolar dopant dissolved therein.

In accordance with another embodiment of the disclosure, there is provided a process for producing a cholesteric display. The process includes forming a polymer network generating mixture by mixing a nematic liquid crystal with a reactive monomer and a photoinitiator, adding the polymer network generating mixture to an empty liquid crystal cell, wherein the liquid crystal cell is bounded on opposite sides by a first and a second substrate, applying an electric field across the liquid crystal cell to place the nematic liquid crystal material into the homeotropic state, irradiating the liquid crystal cell with UV radiation or VIS radiation to grow the polymer network orthogonally oriented with respect to the first and second substrates, removing from the liquid crystal cell the polymer network generating material leaving behind only the polymer network intact, and adding to the liquid crystal cell a cholesteric liquid crystal mixture. The cholesteric display produced by this process is also disclosed herein.

In accordance with still another embodiment of the disclosure, there is provided a device having a liquid crystal composition between a first and a second substrate. A polymer network is orthogonally formed with respect to the first and the second substrate, thereby forming smaller liquid crystal domains than would form without the polymer network. The liquid crystal composition includes a cholesteric liquid and a dipolar dopant, wherein the liquid crystal composition is switchable between a first focal-conic state made of larger liquid crystal domains when the device is transparent, and a second focal-conic state made of smaller liquid crystal domains when the display is white. Each of the two states is stable for a defined period of time when the electric field is removed.

These and other non-limiting aspects of the embodiments of the development are more particularly disclosed below.

BRIEF DESCRIPTION OF THE DRAWINGS

The following is a brief description of the drawings, which are presented for the purposes of illustrating the development disclosed herein and not for the purposes of limiting the same.

DETAILED DESCRIPTION

Figure 1:
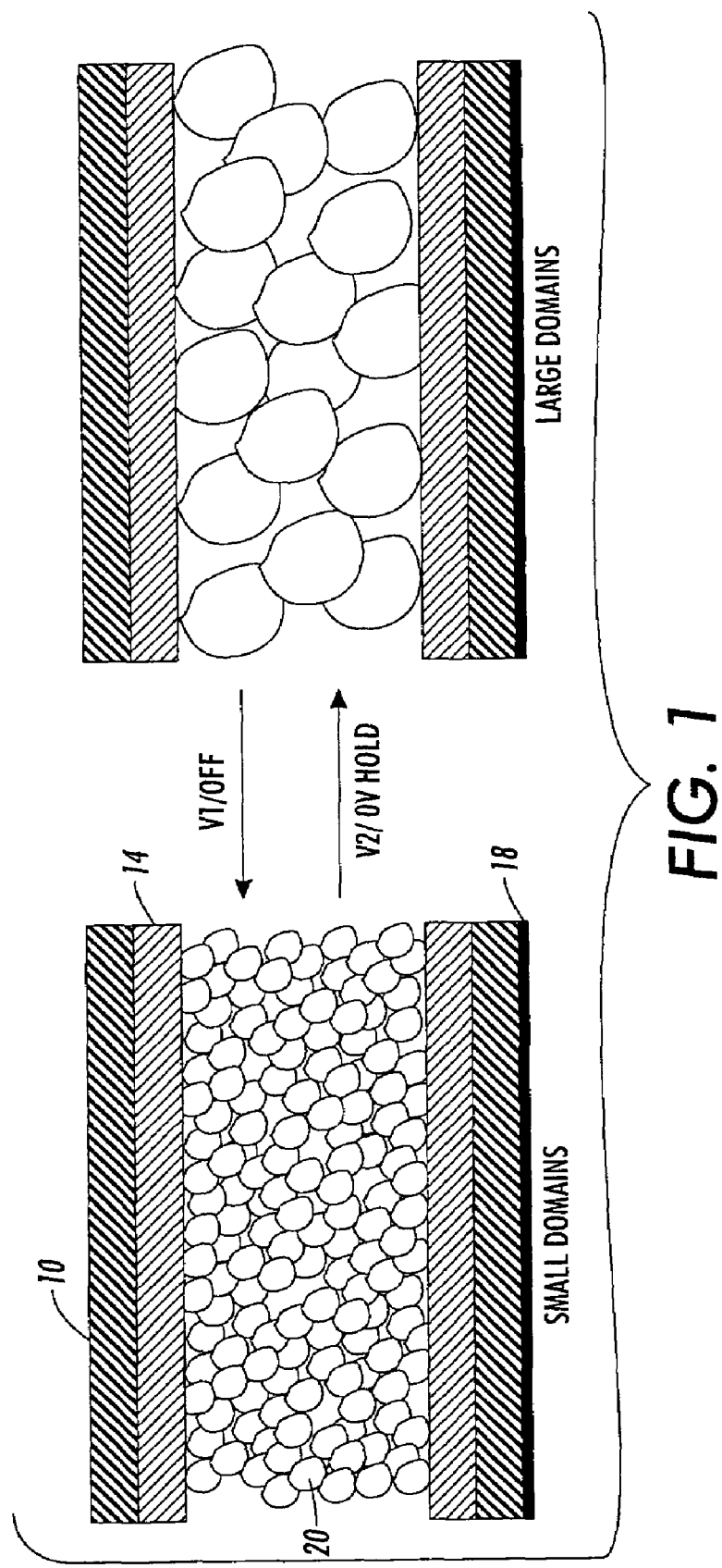
FIG. 1 is a simplified elevational view of small and large domains in a Domain Controlled Liquid Crystal display.
Figure 2:
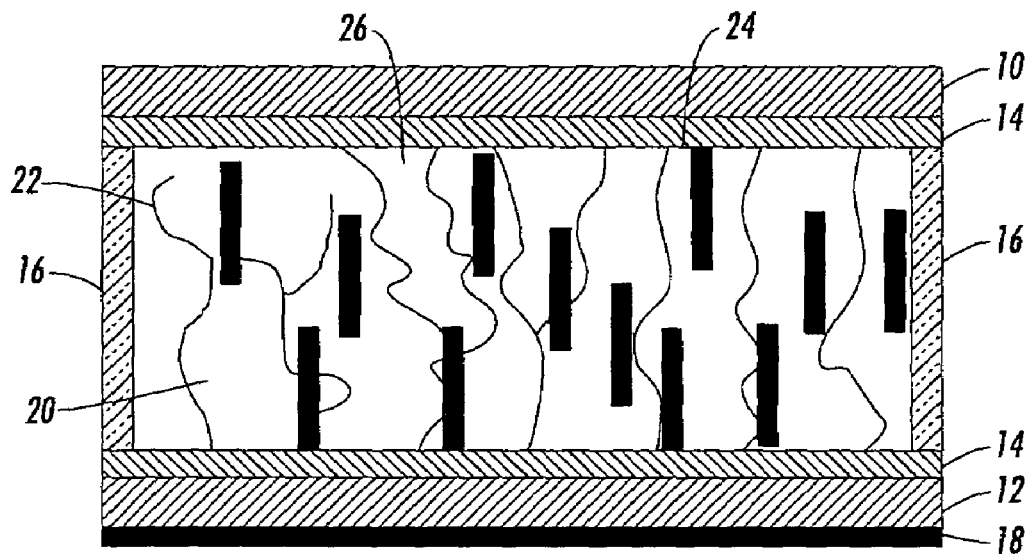
FIG. 2 is a simplified elevational view of a liquid crystal cell including a homeotropic nematic mixture during a polymer network forming stage according to various embodiments of the present disclosure.
Figure 3:
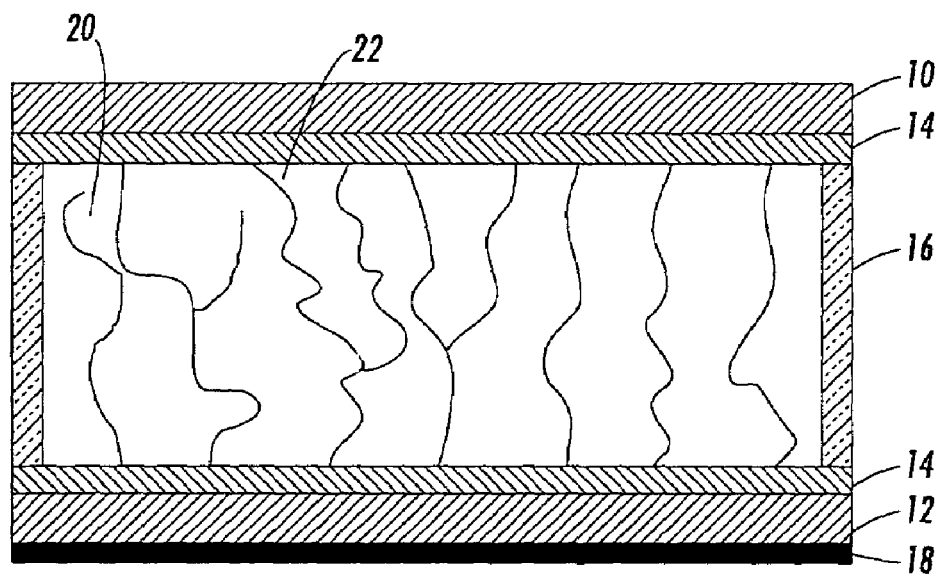
FIG. 3 is a simplified elevational view of the liquid crystal cell polymer network after removal of the nematic material.
Figure 4:
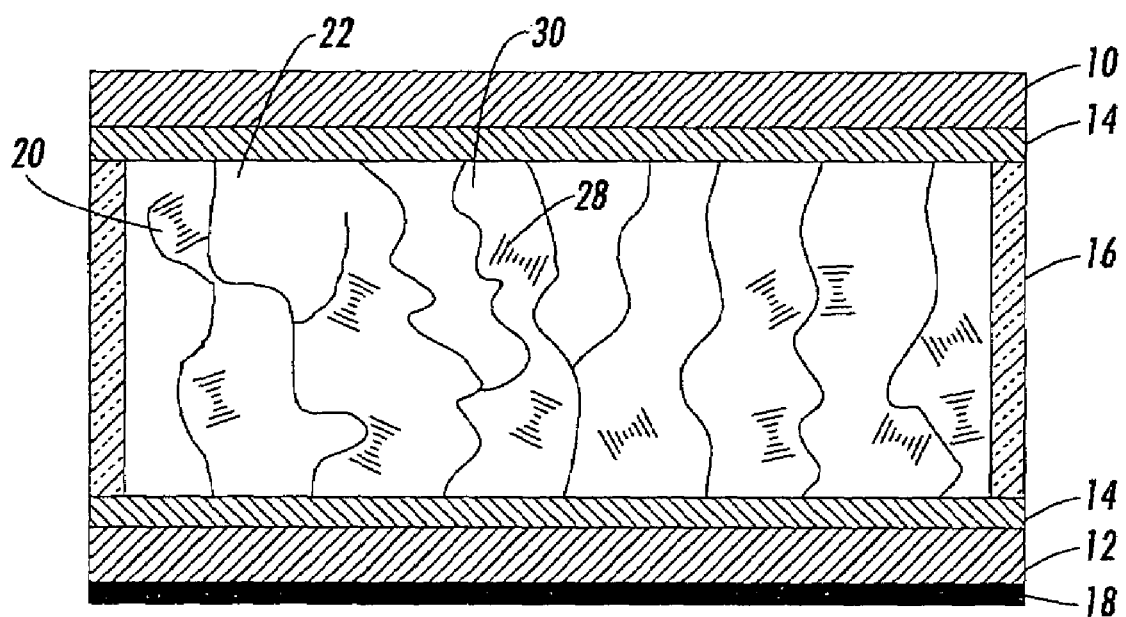
FIG. 4 is a simplified elevational view of the liquid crystal cell after filling with a liquid crystal mixture containing a dipolar dopant according to embodiments of the present disclosure.

For the embodiments described herein, a cell is illustrated in FIGS. 2-4 for purposes of explaining embodiments and concepts of the present application. It is to be understood that the present application is not limited by the embodiment shown in the figures. For example, various schemes of addressing the cell or portions of the cell, and applying an electric field to the addressed portions are known in the art, and the present application is not limited to any particular scheme.

The cell shown in FIG. 2 includes an observer-side substrate 10 and a back-side substrate 12. The substrates are typically made of glass or other transparent materials which may be flexible. The cell also includes transparent electrodes 14 for generating a selectively applied electric field in the cell or portions of the cell. Spacers 16 may be employed for the purpose of maintaining a predetermined gap between the substrates 10, 12, and an absorptive coating 18 may be applied to the back-side substrate 12.

Switching, as described herein, is based on liquid crystal domain size changes with the liquid crystal being maintained in a focal-conic state in both transparent and white states. As shown in FIGS. 2-4, the size of the fixed-size physically separated liquid crystal domains 20, which are separated by a polymer network 22, differ from domain to domain. The size of these polymer-separated liquid crystal domains 20 are made larger, in order to provide transparent focal-conic liquid crystalline domains, when the cell is switched to its large liquid crystal domain size.

When the cell is switched to small-size liquid crystal domains, i.e. a strongly scattering or white state, because the size of even the large domains is relatively small, the size of the small domains is further reduced and the number of small domains increased, allowing for increased white reflectivity. In this way, there are two controls over the size of the liquid crystal domains. One control disclosed herein, and described in more detail below, is a liquid crystal domain stabilizing component which also induces bistability. A second domain size control is provided by the phase-separated polymer network 22. Adjusting parameters for both controls gives a wide range of control for tuning the reflectivity of both the white and transparent states.

The liquid crystal domain stabilizing components used in the described embodiments are conjugated Molecules, absorbing in the UV range, and typically used for photo-polymerization (365 nm, standard). These conjugated molecules block polymerization initiation and, for this reason, an empty cell containing the orthogonally oriented polymer network 22, but not yet containing any liquid crystal mixture, is constructed first. The cell is then filled with a composition containing the liquid crystal mixture and liquid crystal domain stabilizing component. In embodiments where macromolecular liquid crystal domain stabilizing materials are used, the cell containing the polymer network 22 is filled with a mixture containing the cholesteric liquid crystal, polymerizable liquid crystal domain stabilizing monomer and initiator. After filling and sealing, the cell is heated (in the case of thermal polymerization) or illuminated with visible (VIS) light.

The empty cell, containing only the orthogonally oriented polymer network 22, but no liquid crystal mixture, is prepared in the following manner. In a first step, a nematic liquid crystal 24 is mixed with a monomer possessing at least two polymerizable groups and a UV initiator. The cell is filled with this mixture 26 and illuminated with UV light, while an electric field is applied across the cell, by applying a voltage to the electrodes 14 for example, to maintain the nematic liquid crystal 24 in the homeotropic state, i.e. with the nematic molecules orthogonal to the substrates 10,12. The nematic liquid crystal molecules 24 force the polymer network 22 to grow orthogonally to the cell surface, i.e. the substrates 10, 12.

In the next step, the nematic liquid crystal 24 mixture 26 is removed by washing the cell with a suitable solvent. The solvent is chosen in such a way that it dissolves and removes the liquid crystal material 24 while rinsing the inside of the cell, but the solvent does not dissolve the polymer forming the polymer network 22, leaving the polymer network 22 essentially intact, with the mixture 26 removed as shown in FIG. 3. Suitable solvents include, for example, acetone, methyl-ethyl-ketone, ethanol or isopropanol, which are good solvents for organic molecules but poor solvents for polymers such as those used in forming the polymer network 22. For very thin cells like the ones used in the described embodiments (e.g., from about 5 µm to about 30 µm) the rinsing solvent advances into the cell by capillary action, provided that the pressures inside and outside the cell are the same. For this reason the cell possesses two holes (not shown), unlike conventional cells, which possess only one hole which is used for vacuum filling. The empty cell, containing only the polymer network 22 is vacuum dried to remove any remaining solvent and is then filled with the desired domain controlled liquid crystal mixture 28 as shown in FIG. 4.

The material used to form homeotropically aligned polymeric networks is a UV curable monomer or oligomer structure having at least two polymerizable groups so as to be cross-linkable and include, as previously known in the art, bis-acrylates, tris-acrylates, bis-methacrylates and epoxy systems. Many of these polymer precursors are commercially available. Optimized monomers contain biphenyl groups in order to adjust the indices of refraction of the polymer network and the liquid crystal, to reduce unnecessary scattering in the transparent state. It should be noted that the monomers used for fabrication of Domain Controlled Liquid Crystal Displays (DCLCs) are different from those used for fabrication of orthogonally oriented polymer networks (used for fabrication of PDLC displays). Monomers for DCLCs have donor/acceptor functionalities, with a permanent dipole moment. PDLC monomers do not necessarily have a polar structure, many of them being symmetrical, i.e., having no dipole moment. In addition, while not a limiting factor, DCLCs monomers can possess only one polymerizable group, unlike the monomers usable for PDLCs which have at least two polymerizable groups. UV initiators are commercially available, for example, from CIBA (Irgacure and Darocur initiator classes).

An exemplary fabrication of a cell containing liquid crystal domain stabilizing material into perpendicularly aligned polymer network is described as follows.

A 15 micron thick cell possessing two holes at the opposite ends is capillary filled with a mixture containing 97.5% BL087 (nematic liquid crystal), 2% RM257 (polymerizable difunctional monomer) and 0.5% Darocur 1173 (UV initiator). The cell is illuminated with UV light while an electric field is applied to the cell, to maintain the liquid crystal in the homeotropic state. The liquid crystal is then removed by several cycles of rinsing the cell with methyl-ethyl-ketone as a solvent (capillary filling), followed by solvent removal by placing the cell under vacuum. Sonication of the cell placed in the solvent may increase the rate of cleaning, but should be used with caution because sonication for prolonged periods of time could result in removal of some of the polymer material. After vacuum drying, the cell contains only the polymer network, with no liquid crystal. One end of the cell is glued (sealed), then the cell is vacuum filled with a composition made a mixture containing 91% of BL118/BL087=60/40 (liquid crystal mixture) and 9% of 4-NC—C6H4-N(n-C10H21)2 (small molecule liquid crystal stabilizing material).

In another embodiment, similar to the above, the empty cell as shown in FIG. 3 is vacuum filled with the bistable cholesteric liquid crystal mixture 28 further containing a dipolar dopant 30 as illustrated in FIG. 3. The polymer network 22 present inside the cell induces formation of smaller liquid crystal domains than would form without the polymer network 22. This simple procedure allows for increased white reflectivity of over the first-described embodiment. Liquid crystal domain size is controlled by varying the amount of monomer, irradiation time and UV light intensity.

The dipolar dopant 30 comprises an electron donor group and an electron acceptor group connected at the ends of a conjugated path. This results in the general structure: Donor-Conjugated Path-Acceptor. To ensure miscibility of the dipolar dopant and the liquid crystal, a liquid crystal compatibilizing moiety is attached to the dipolar dopant molecule. The electron donor is an atom or a group of atoms that have a negative Hammett parameter. The electron acceptor is a group of atoms having a positive Hammett parameter. Donor group is selected from an atom selected from the group consisting of N, O, S, and P, where the valence of the atom is satisfied by bonding to at least one other moiety to satisfy the valence of the atom; the other moiety or moieties to satisfy the valence of the atom selected as the electron donor moiety may be for instance a hydrogen atom, or short hydrocarbon group such as a straight alkyl chain having for example 1 to about 3 carbon atoms.

The conjugated bridging moiety may be any suitable group through which electrons can pass from the electron donor moiety (D) to the electron acceptor moiety (A). In embodiments, the conjugated bridging moiety (C) is a π-electron conjugated bridge that is composed of for example (there is no overlap among the categories (a), (b), and (c) described below):

(a) at least one aromatic ring such as one, two or more aromatic rings having for instance from about 6 carbon atoms to about 40 carbon atoms such as —$C_6H_4$—, and —$C_6H_4$—$C_6H_4$—;

(b) at least one aromatic ring such as one, two or more aromatic rings conjugated through one or more ethenyl or ethynyl bonds having for instance from about 8 carbon atoms to about 50 carbon atoms such as —$C_6H_4$—CH=CH—$C_6H_4$—, and —$C_6H_4$—C≡C—$C_6H_4$—; and (c) fused aromatic rings having for instance from about 10 to about 50 carbon atoms such as 1,4-$C_{10}H_6$ and 1,5-$C_{10}H_6$.

The electron acceptor moiety (A) may be any suitable atom or group capable of accepting electrons. In embodiments, the electron acceptor moiety (A) is an electron withdrawing functional moiety which according to Hammett equation possesses a positive Hammett constant. The electron acceptor moiety may be for example the following:

(a) an aldehyde (—CO—H);

(b) a ketone (—CO—R) where R may be for example a straight chain alkyl group having for example 1 to about 3 carbon atoms, such as methyl, ethyl, propyl and isopropyl.

(c) an ester (—COOR) where R may be for example a straight chain alkyl group having for example 1 to about 3 carbon atoms, such as methyl, ethyl, propyl and isopropyl.

(d) a carboxylic acid (—COOH);

(e) cyano (CN);

(f) nitro (NO2);

(g) nitroso (N=O);

(h) a sulfur-based group (e.g., —SO2—CH3; and —SO2—CF3);

(i) a fluorine atom;

(k) a boron atom.

The liquid crystal compatibilizing moiety can be connected to the donor group, acceptor group or conjugated path group. The liquid crystal compatibilizing moiety (S) may be any suitable group that increases miscibility of the liquid crystal domain stabilizing compound with the liquid crystal. The liquid crystal compatibilizing moiety (S1 through S6) may be for example the following:

(a) a substituted or unsubstituted hydrocarbon having for example 1 to about 30 carbon atoms.

(b) a heterocyclic moiety having for example from 5 to about 15 atoms (referring to number of carbon atoms and heteroatom(s), where the heteroatom can be for instance N, O, S, P, and Se. Exemplary examples include: piperidine, ethyl-piperidine, methylpyrrolidine.

(c) a hetero-acyclic moiety having for example from 5 to about 15 atoms (referring to number of carbon atoms and heteroatom(s), where the heteroatom can be for instance N, O, S, P, and Se. Exemplary examples include: glycol and polyglycol ethers, alcohol moieties like for example 2-hydroxy-ethyl, and thiol moieties like for example ethyl-2-methyl-ethyl-thioether.

In embodiments, the liquid crystal compatibilizing moiety (S) may be a hydrocarbon optionally substituted with for example a liquid crystal moiety, a heterocyclic moiety optionally substituted with for example a liquid crystal moiety, or a hetero-acylic moiety optionally substituted with for example a liquid crystal moiety.

The dipolar dopant can be a small molecule or a macromolecule. A macromolecule type of dipolar dopant requires that the precursor monomer to have at least one polymerizable group (Z). The polymerizable moieties may be any monomers that can be polymerized to form an oligomer/polymer. Suitable monomers include those having a double bond (—CH=$CH_2$) or triple bond capable of being polymerized such as acryl or ethenyl.

For example, the dipolar dopant 30 may comprise a push-pull molecule containing long alkyl chains is synthesized as represented in the following formula:

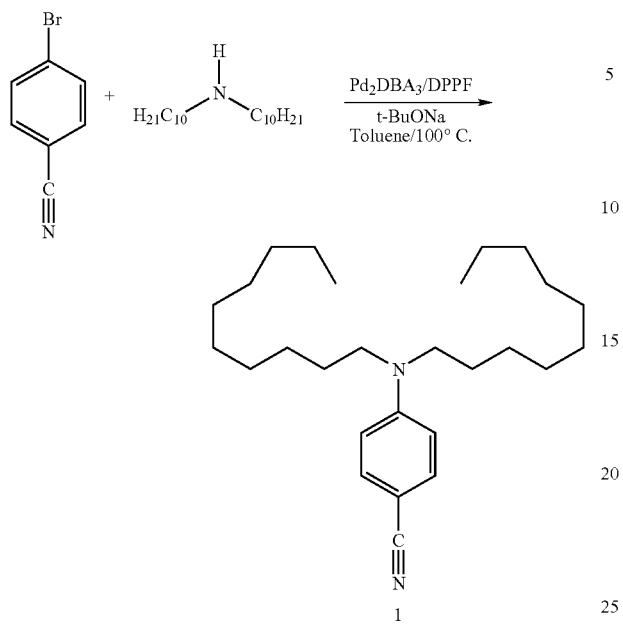

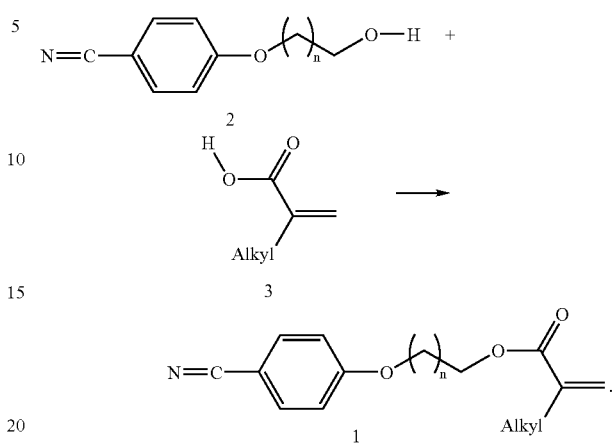

The dipolar dopant 30 is obtained by a palladium catalyzed coupling reaction between 4-bromo-benzonitrile and the corresponding secondary amine. Ten percent of the push-pull molecule is then dissolved in a cholesteric mixture. The resulting liquid crystalline mixture is cholesteric at room temperature. Other suitable dipolar dopants are described in U.S. Pat. No. 6,767,480 B2, which is incorporated herein in its entirety by reference.

Suitable cholesteric liquid crystalline materials are available from suppliers such as Merck & Co., Inc. Non-limiting examples include Suitable cholesteric liquid crystal materials for use herein include for example BL mixtures available from EM Industries, Inc., Hawthorne, N.Y. (BL088, BL 90, BL94 and BL108 as a few examples). The helical pitch is tuned to the desired range by mixing this cholesteric liquid crystal mixture with a nematic liquid crystal. Examples of nematic liquid crystal BL mixtures available at EM Industries, Inc., BL001 (E7), BL002 (E8), BL033 (version of BL002) and BL087, and 5CB (commercially available at Sigma-Aldrich).

The resulting cholesteric mixture is sandwiched between two indium-tin-oxide (ITO) coated glass slides for the substrates 10,12. ITO coatings provide an electrically conductive surface that at the same time offers a high optical transparency. The bottom of the display is coated with an absorptive layer 18, e.g., black. The thickness of the cholesteric layer is fixed, for example, by using glass spacers 16 having a thickness, for example, of about 6.6 µm in the vertical direction as shown in the figure.

In another embodiment, empty cells shown in FIG. 3 are filled with a composition containing a cholesteric liquid crystal and a dipolar macrodopant.

In another embodiment, a branched macrodopant which ensures further breaking of liquid crystal domains to yet smaller sizes is used. The desired result is still further increased white reflectivity. Among the monomers used previously are acrylic acid ester derivatives. Further branching is achieved by using alkyl-acrylate monomers containing the dipolar functional group. The monomers can be synthesized by DCC coupling of alcohols containing the dipolar group and an alkyl chain as a spacer with alkyl-acrylic acids as shown in the following formula:

The synthesized alcohols have been previously synthesized, and the alkyl-acrylic acids are known compounds in the art (Alkyl=Me; Et; Pr).

In an exemplary process, empty cells shown in FIG. 3 containing the polymer network perpendicular to the substrates, are filled with a mixture containing camphoroquinone (VIS initiator), the dipolar monomer shown above, and a commercially available cholesteric liquid crystal mixture made of BL118/BL087=60/40. Camphoroquinone is used as a visible initiator for the polymerization reaction of the monomer. The wavelength for VIS polymerization is 470 nm, provided, for example, by Xenon-Mercury lamps with an appropriate band-pass filter. The choice of VIS initiation is due to the conjugated character of the dipolar group present in the monomer. This results in increased conjugation (red shift of the absorption band). After mixing, the polymerization of the monomer into the cell is initiated with 470 nm VIS light, wherein the camphoroquinone absorbs.

Because the white reflectivity of the white state is significantly increased due to the smaller domain sizes in the above-described embodiments, thinner devices with sufficient reflectivity can be fabricated. This decreases the switching voltage of the display, allowing the use of less expensive display drivers. Overall, the price of the device decreases significantly.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention of claimed is:

1. A bistable cholesteric liquid crystal display comprising:
   (a) a liquid crystal cell having a first substrate and a second substrate;
   (b) a polymer network orthogonally oriented with respect to the substrates, thereby defining liquid crystal domains; and
   (c) a liquid crystalline mixture contained within the cell comprising a liquid crystal material and a dipolar dopant dissolved therein.

2. The cholesteric display of claim 1, wherein the dipolar dopant comprises the molecule:

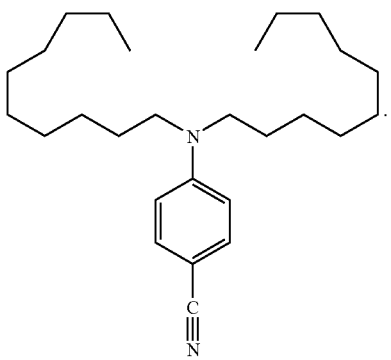

3. The cholesteric display of claim 1, wherein the dipolar dopant comprises a macromolecule of the formula:

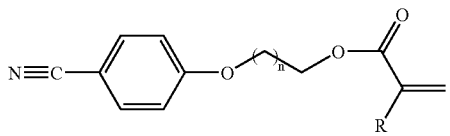

wherein R is selected-from methyl, ethyl, and propyl; n is a repeating unit.

4. The cholesteric display of claim 1, wherein the dipolar dopant is present in an amount of from about 2% to about 20% by weight with respect to the amount of the liquid crystalline mixture.

5. A process for producing a bistable cholesteric liquid crystal display comprising:
  (a) forming a polymer network generating mixture by mixing a nematic liquid crystal with a reactive monomer and a photoinitiator;
  (b) filling an empty liquid crystal cell with the polymer network generating mixture, wherein the liquid crystal cell is bounded on opposite sides by a first substrate and a second substrate;
  (c) applying an electric field across the liquid crystal cell to place the nematic liquid crystal material into the homeotropic state;
  (d) irradiating the liquid crystal cell with radiation to grow the polymer network orthogonally oriented with respect to the first and second substrates;
  (e) removing the nematic liquid crystal from the liquid crystal cell, leaving only the polymer network intact; and
  (f) refilling the liquid crystal cell with a cholesteric liquid crystal mixture.

6. The process of claim 5, wnerein a dipolar dopant is added to the cholesteric liquid crystal mixture prior to the refilling.

7. The process of claim 5, wherein the dipolar dopant is added to the cholesteric liquid crystal mixture in an amount of from about 2% to about 20% by weight with respect to the amount of the cholesteric liquid crystal mixture.

8. The cholesteric display produced by the process of claim 5.

9. The process of claim 5, wherein the dipolar dopant comprises branched bistable alkyl-acrylate monomers.

10. A cholesteric liquid crystal display device comprising:
  a liquid crystal cell having a first substrate and a second substrate and a polymer network, wherein the polymer network is orthogonally formed with respect to the first and the second substrate, thereby forming smaller liquid crystal domains than would form without the polymer network; and,
  a liquid crystal composition placed between the first and second substrates, including a cholesteric liquid crystal and a dipolar dopant, wherein the liquid crystal composition is switchable between a first focal-conic state made of larger liquid crystal domains and a second focal-conic state made of smaller liquid crystal domains and where each of the two states is stable when the electric field is removed.

11. The device of claim 10, further comprising:
  an electric field generator that electrically induces the switching between the focal-conic state with larger liquid crystal domains and the focal-conic state with smaller liquid crystal domains.

12. The device of claim 10, further including a colored surface positioned to absorb a portion of a predetermined light that passes through the cholesteric crystal liquid in the focal-conic state made of larger liquid crystal domains such that an observer sees a predetermined color.

13. The device of claim 10, wherein the cholesteric liquid is substantially transparent to the predetermined light when in the focal-conic state to allow passage of the predetermined light through the cholesteric crystal liquid, and to allow exit of the non-absorbed portion of the predetermined light from the cholesteric liquid.

14. The device of claim 10, wherein the dipolar dopant comprises the molecule:

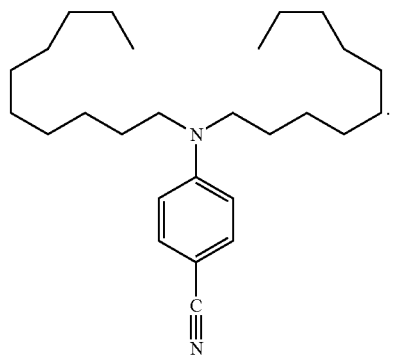

15. The device of claim 10, wherein the dipolar dopant comprises a macromolecule of the formula:

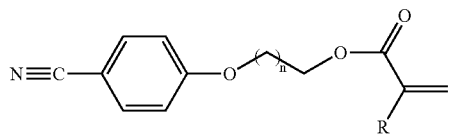

wherein R is selected from methyl, ethyl, and propyl.

16. The device of claim 10, wherein the dipolar dopant is present in an amount of from about 2% to about 20% by weight with respect to the amount of the cholesteric crystal liquid.

* * * * *